Feb. 9, 1943.  W. C. TYLER  2,310,329
FLEXIBLE COUPLING
Filed Jan. 9, 1940
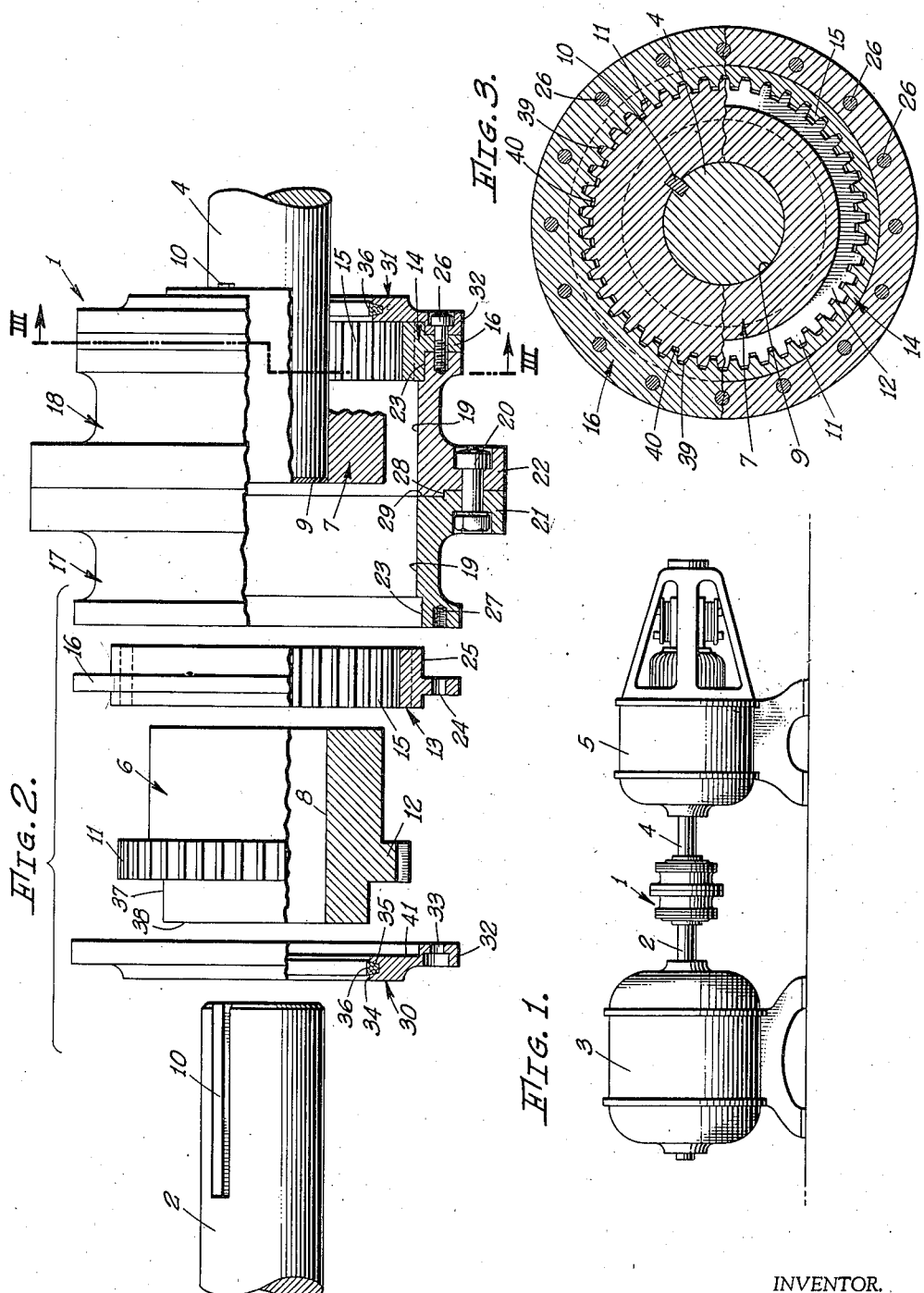
INVENTOR.
WARREN C. TYLER
BY
*Harold R. Mattingly*
ATTORNEY Patented Feb. 9, 1943

2,310,329

UNITED STATES PATENT OFFICE 2,310,329

FLEXIBLE COUPLING

Warren C. Tyler, Phoenix, Ariz.

Application January 9, 1940, Serial No. 313,080

3 Claims. (Cl. 64—9)

My invention relates to shaft couplings and has particular reference to a flexible shaft coupling permitting two rotating shafts to be drivably coupled to each other when such shafts are not accurately aligned with each other.

In many machine applications it is required that two rotating shafts be drivably engaged with each other in a more or less permanent fashion. Couplings for accomplishing this driving engagement may be classed as rigid couplings and flexible couplings, the former class being inapplicable to those installations where the shafts to be coupled together are disposed out of alignment with each other. The second class of couplings is intended for use where a certain amount of mis-alignment between the shafts is present, this class being distinguished from universal joints which are employed for drivably engaging a pair of rotating shafts where there is or may be a great deal of angular mis-alignment between the shafts.

Prior attempts to provide a flexible coupling of this latter class, while eminently successful, have nevertheless been characterized by certain disadvantages tending to impair the ready acceptance of these couplings by industries employing machines requiring shafts to be coupled together. One of the most popular type of such flexible coupling is that which employs a pair of splined hubs, one for the end of each of the shafts to be coupled together, together with a pair of internal splined coupling members adapted to slip over and engage the splined hub members and be secured to each other as by means of bolts. This construction provides for a sufficient amount of mis-alignment between the shafts to take care of nearly all industrial needs. However, if the coupling becomes worn or parts broken due to adverse load conditions or due to an unusual amount of misalignment between the shafts, it is necessary to replace the entire coupling and because of the relatively complicated construction of the coupling this entails a considerable expenditure of money and time.

It is accordingly an object of my invention to provide a flexible shaft coupling wherein the driving engagement between the shafts is obtained through the use of inter-engaging splined members and in which at least one set of said splined members is made readily removable and interchangeable, permitting the removal of worn parts from the coupling and the substitution therein of new parts.

It is also an object of my invention to provide a flexible coupling construction of the character set forth in the preceding paragraph in which one set of spline members is made from a softer and less wear-resistant material than is the coacting splined members, thus insuring that any wear or breakage will take place in the softer or less wear-resistant member.

It is a still further object of my invention to provide a flexible shaft coupling of the character set forth in the preceding paragraphs in which the least wear-resistant splined member is made readily removable and interchangeable so as to permit removal of a worn part and the substitution therefor of a new part.

It is also an object of my invention to provide a flexible shaft coupling of the character set forth in the preceding paragraphs which embodies an oil-tight construction permitting all of the working parts of the coupling to be completely submerged in a lubricant.

It is a further object of my invention to provide a flexible coupling of the character set forth in the preceding paragraph in which the splines on the inter-engaging splined members are so constructed that the normal movement of these members relative to each other during rotation of the shafts will operate to circulate lubricant over the load bearing surfaces of the splines.

It is an additional object of my invention to provide a flexible shaft coupling construction of the character set forth in the preceding paragraph in which is included complementary boss and recess constructions for assisting in the initial aligning and coupling of the shafts desired to be coupled together.

Other objects and advantages of my invention will be apparent from a study of the following specifications, read in connection with the accompanying drawing, wherein:

Fig. 1 is an elevational view illustrating one form of flexible shaft coupling of my invention as employed for coupling the shaft of an electric generator to the shaft of an electric motor;

Fig. 2 is an enlarged elevational view of the preferred embodiment of my invention with parts broken away and parts in section to show the interior construction, one half of the coupling being shown as an exploded view to more clearly illustrate the details of construction; and Fig. 3 is a transverse section taken substantially along the line III—III to show the manner in which the splined members are engaged with each other.

Referring to the drawing, I have illustrated in Fig. 1 a flexible shaft coupling 1 constructed in accordance with my invention as being employed for coupling a driving shaft 2 of a motor 3 to a driven shaft 4 of an electric generator 5. It will be understood that the electric motor 3 and electric generator 5 are merely illustrative of mechanisms which employ rotating shafts as a part thereof and that such mechanisms may, when installed, be mounted in such position as to place the shafts 2 and 4 thereof in substantial alignment.

Because of the warping of the base to which the machines 3 and 5 are secured and because of the difficulty in preventing movement of the machines relative to the base over a long period of time, it is common to have a small amount of mis-alignment between the shafts 2 and 4. The use of a rigid coupling for inter-engaging these shafts imposes unusually heavy loads on the bearings of the machines and, furthermore, tends to cause rapid crystallization and ultimate breakage of the shafts by virtue of their being rotated during the time they are continuously deformed in one direction by virtue of the bending forces applied thereto by the tendency of the rigid coupling to bring the shafts into alignment with each other.

These difficulties may be obviated by employing the flexible coupling 1 of my invention. As illustrated in Figs. 2 and 3, the coupling 1 includes a pair of hub members 6 and 7, one for each of the shafts 2 and 4, these hub members being provided with internal bores 8 and 9 adapted to receive the shafts 2 and 4. The hub members 6 and 7 may be secured to their associated shafts 2 and 4 by means of keys 10 coacting with set screws or other suitable means for obtaining a driving engagement of the hub members with their respective shafts. Each of the hub members 6 is provided with a set of relatively short external splines 11, these splines being conveniently formed, as indicated in Fig. 3, as gear teeth upon a radially extending flange 12 which is formed on the hub members 6 and 7.

I provide for each of the hub members 6 and 7 internal splined members 13 and 14, each of these members comprising an annular ring upon the interior of which is cut splines 15 adapted to inter-fit with the external splines 11 and when slid into engagement therewith drivably engage the splined members 13 and 14 with the hubs 6 and 7. Each of the internal splined members 13 and 14 is preferably provided with a radially extending flange 16. Drivable engagement between the shafts 2 and 4 may accordingly be obtained by rigidly securing the flanges 16 of the internally splined members 13 and 14 to each other and for this purpose I employ a pair of coupling halves 17 and 18. Each of these halves is provided with an internal bore 19 of a sufficiently large diameter to readily pass the hub members 6 together with their integral splined flanges 12.

The coupling halves are adapted to be secured to each other as by means of a plurality of bolts 20 or other similar suitable attaching means extended through bores provided in corresponding annular flanges 21 and 22 provided on these coupling halves. The opposite ends of the coupling halves 17 and 18 are recessed as indicated at 23 to receive the outer circumference 24 of the body portion of the internally splined members 13 and 14, the flange portion 16 of these members being bored, as indicated at 25, to receive screws 26 or other suitable attaching means threadedly engaged with corresponding threaded bores 27 formed in the outer faces of the coupling halves 17 and 18.

In order to prevent any unusual wear of the internally splined members 13 and 14 and that part of the coupling halves with which they are associated, I prefer to make the outer circumference 24 of the internally splined members 13 and 14 of such size relative to the diameter of the recess 23 as to provide for a press fit of the internally splined members within this recess. This tends to prevent any relative motion between the splined members and the coupling halves and to reduce the load which must be transmitted by the screws 26. However, in order to provide for the possibility of the internally splined members 13 and 14 becoming loose in the recess 23, I prefer to arrange the bolted connection afforded by the screws 26 of such strength as to enable this connection to carry the entire load which must be transmitted by the coupling. The stresses which are imposed upon these screws may be reduced by eliminating any shock stresses as by carefully reaming the holes or apertures in which these screws are received to provide an accurate fit between these screws and the holes in the flange portion 16. Furthermore, additional strength may be imparted to this connection by employing screws made of alloy steel or hardened steel having greater strength than the usual steel employed in machine screws. The same principles of construction may be incorporated in the bolted connection of the two coupling halves to each other as by reaming the holes which are provided in the annular flanges 21 and 22 to an accurate fit with the bolts 20 which are passed therethrough.

It will thus be seen that the shafts 2 and 4 are, by this means, drivably engaged with each other, the torque which is transmitted by the driving shaft 2 being transferred to the internally splined member 13 by means of the interposed hub member 6 and then carried to the other internally splined member 14 through the interposed coupling halves 17 and 18, the other internally splined member 14 acting to transmit the torque to the driven shaft 4 through the interposed hub member 7.

As an aid to effecting the initial installation of the coupling on the shafts 2 and 4 I prefer to form one of the coupling halves, such as the half 18, with a circular boss 28 adapted to be received in a corresponding circular recess 29 formed in the other coupling half 17 so that approximately correct alignment of the shafts may be obtained by moving the machines of which they form a part into such positions as to permit the boss 28 to be readily received within the recess 29. Furthermore, the boss 28 and recess 29 operate to accurately center and align each of the coupling halves 17 and 18 with each other, thus insuring the proper engagement between the inter-engaged splined members, the outer ones of which are secured to these coupling halves.

In order that any wear of parts or breakage resulting from overloading or excessive misalignment may be taken almost entirely on the coupling part which is the most easily replaced and the least expensive to acquire, I prefer to form the internal splined members 13 and 14 of a softer and less wear-resistant material than that employed in the manufacture of the splined hub members 6 and 7, bronze being admirably suited for this purpose.

Inasmuch as any mis-alignment which may be present between the shafts 2 and 4 will cause the splined members to slide relative to each other as the shafts rotate, it is essential that these surfaces be adequately lubricated. I prefer to employ a petroleum lubricating oil and accordingly provide end caps 30 and 31 which operate to seal off the internal space enclosed by the coupling halves 17 and 18 to provide therein an oil-tight reservoir in which a considerable quantity of lubricant may be placed. Each of the end caps 30 and 31 is accordingly provided with a flange portion 32 of substantially the same diameter as the flanges 16 formed on the internally splined members, the flanges 32 being bored as indicated at 33 to receive the aforementioned screws 26, thus permitting these screws to serve the dual purpose of securing both the end cap 30 and the internally splined member 13 to the coupling half associated therewith.

Each of the cap members 30 and 31 is provided with an internal bore 34 which is in turn provided with a circumferentially extending recess 35 in which is placed a suitable oil-tight packing material 36. When the coupling is assembled the packing material 36 bears against an exterior cylindrical surface 37 provided by a boss portion 38 of the hub members 6 and 7 which boss portions extend outwardly from the splined flange 12. It will thus be seen that the oil-tight packing 36 permits the cap members 30 and 31 to move relative to the hub members 6 and 7 as the shafts 2 and 4 rotate while maintaining an oil-tight seal therebetween so that a considerable quantity of lubricating oil may be placed in the space enclosed within the coupling construction, thus insuring an adequate supply of lubricant at all times.

Oil leakage through the bolted connection between the coupling half flanges 21 and 22 and around the internally splined members 13 and 14 between the flanges 16 and the end caps 30—31 and between the flanges 16 and the coupling halves 17—18 may be prevented by painting or doping these interfitting surfaces with a suitable oil sealing compound before the connections are made up tight.

I have found that the oil enclosed within the coupling halves 17 and 18 may be effectively circulated through the inter-engaging splines over the wearing surfaces thereof while the shafts are rotating by forming the splines in the fashion illustrated in Fig. 3, this construction providing channels 39 and 40 of considerable size which are disposed between the bottom of the spline grooves and the tops of the spline teeth which are received in these grooves. This is readily accomplished by forming the teeth and grooves of a tapered shape and making the grooves narrower than the teeth. The pitch diameters of the two sets of inter-engaging splines are accordingly so adjusted as to provide whatever clearance is required between the teeth when assembled in the fashion indicated in Fig. 3 to permit the teeth to move angularly relative to each other the amount caused by the mis-alignment of the shafts. Thus as the shafts rotate the centrifugal force acting upon the oil contained within the reservoir space operates to throw the oil to the outside of this space and further tends to cause it to flow axially of the coupling so as to force the oil into the channels 39 and 40 to supply lubricant to the spline teeth. Furthermore, as the individual teeth on the externally splined member slide relative to the teeth on the internally splined member, the oil is circulated thereby back and forth through the passages 39 and 40 to uniformly distribute the oil over the wearing surfaces, thus guaranteeing a continuous, unbroken film of oil between all of the inter-engaged wearing parts.

In this connection, my invention contemplates the provision of a coupling which is so constructed as to obviate the need of employing a fluid lubricant. This may be accomplished by making the ring members 13 and 14 from a metallic alloy which has inherent self-lubricating properties. It has been found that various bronzes are to a considerable extent self-lubricating and that alloys similar in composition to the bronzes but including a proportion of nickel have still greater self-lubricating properties, and that the employment of such an alloy for the ring members 13 and 14 permits the coupling of my invention to operate over extended periods without any lubricating material being introduced into the space within the coupling halves.

In addition to providing a liquid-tight enclosure for receiving a supply of lubricant, the cap members 30 and 31 operate to prevent undue axial movement of the coupling halves 17 and 18 and the ring members 13—14 carried thereby relative to the shafts 2 and 4 and the hub members 6 and 7. This is accomplished by providing each of the cap members with a flat annular portion or thrust face 41 extending between the ring members 13—14 and the exterior of the boss portion 38 of the hub members, this annular portion 41 being disposed in a position to engage the radially extending sides of the flanges 12 which are formed on the hub members 6 and 7 whenever the coupling halves 17—18 are moved a short distance either side of a neutral or centralized position.

From the foregoing it will be observed that I have provided an improved flexible coupling of the inter-engaging spline type which is characterized by a novel construction permitting worn parts to be readily removed and another new part substituted therefor. In this connection it will be observed that I have provided a construction permitting one of the wearing parts (that which is most easily removed and replaced) to be made of a softer and less wear-resistant material than that employed for the remainder of the parts so as to insure that any excessive wear or breakage will occur to the readily removable part.

It will also be observed that I have provided in my coupling construction a means for assisting in the initial alignment of the shafts to be coupled, which means also operates to effect a positive and accurate alignment of the coupling halves and the internally splined members carried thereby.

Attention is called to the fact that the preferred embodiment of my invention permits a considerable quantity of lubricant to be placed within the coupling so that an adequate supply of such lubricant is insured for a long period of operation, thus reducing the cost of maintaining such coupling and reducing the danger of accidents or failures resulting from lack of lubricating medium. Furthermore, my invention comprehends the use of materials having self-lubricating properties so that should the coupling be allowed to operate without a supply of lubricant for the wearing parts, such operation will not result in damage to or destruction of the coupling.

While I have shown and described the preferred embodiment of my invention, I do not desire to be limited to any of the details of construction shown or described herein, except as defined in the appended claims.

I claim:

1. In a flexible coupling for drivably interconnecting a pair of rotatable shafts, the combination of: a hub member secured to the end of each of said shafts, each of said hubs including an externally splined portion; a coupling member encircling said shafts and said hub members; a pair of ring members disposed at opposite ends of said coupling member, each of said ring members having internal splines drivably engaged with the externally splined portion of the hub member associated therewith, said ring members being formed of a softer and less wear-resistant material than that from which said hub members are formed; and means securing said ring members to opposite ends of said coupling member.

2. In a flexible coupling for drivably interconnecting a pair of rotatable shafts, the combination of: a hub member secured to the end of each of said shafts, each of said hub members including an externally splined portion; a pair of ring members, one for each of said hub members, each of said ring members having internal splines drivably engaged with the externally splined portion of the hub member associated therewith; a coupling member encircling said shafts and said hub members interposed between said ring members; a cap member encircling each of said hub members and disposed outside of said ring members; and securing means interengaging said cap members with opposite ends of said coupling member for clamping said ring members therebetween.

3. In a flexible coupling for drivably interconnecting a pair of rotatable shafts, the combination of: a hub member secured to the end of each of said shafts, each of said hub members including a radially extending flange portion having external splines formed thereon; a pair of ring members, one for each of said hub members, each of said ring members having internal splines drivably engaged with the external splines formed on the flange portion of the hub member associated therewith; a coupling member encircling said shafts and said hub members interposed between said ring members; a cap member encircling each of said hub members and disposed outside of said ring members, said cap members each including a thrust face engageable with the side of said flange portion; and securing means inter-engaging said cap members with opposite ends of said coupling member for clamping said ring members therebetween.

WARREN C. TYLER.